(12) United States Patent
Matsuo et al.

(10) Patent No.: US 10,501,059 B2
(45) Date of Patent: Dec. 10, 2019

(54) STEREO CAMERA DEVICE

(71) Applicant: Hitachi Automotive Systems, Ltd., Hitachinaka-shi, Ibaraki (JP)

(72) Inventors: Shigeru Matsuo, Tokyo (JP); Tadaaki Kitamura, Tokyo (JP); Shinichi Nonaka, Hitachinaka (JP); Takeshi Nagasaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/765,853

(22) PCT Filed: Nov. 7, 2016

(86) PCT No.: PCT/JP2016/082901
§ 371 (c)(1),
(2) Date: Apr. 4, 2018

(87) PCT Pub. No.: WO2017/090410
PCT Pub. Date: Jun. 1, 2017

(65) Prior Publication Data
US 2018/0281757 A1    Oct. 4, 2018

(30) Foreign Application Priority Data

Nov. 25, 2015  (JP) ................ 2015-229272

(51) Int. Cl.
*B60T 7/12* (2006.01)
*G01C 3/06* (2006.01)
(Continued)

(52) U.S. Cl.
CPC ............ *B60T 7/12* (2013.01); *B60Q 9/008* (2013.01); *G01C 3/06* (2013.01); *G01S 17/08* (2013.01);
(Continued)

(58) Field of Classification Search
CPC ...... B60T 7/12; B60T 2210/32; H04N 13/204; H04N 2013/0081; B60Q 9/008;
(Continued)

(56) References Cited

U.S. PATENT DOCUMENTS

2014/0132603 A1* 5/2014 Raghoebardayal ...... G06T 17/00
345/420

FOREIGN PATENT DOCUMENTS

JP   2000-329852   11/2000
JP   2005-024463   1/2005
(Continued)

OTHER PUBLICATIONS

International Search Report (PCT/ISA/210) issued in PCT Application No. PCT/JP2016/082901 dated Feb. 21, 2017 with English translation (four (4) pages).
(Continued)

*Primary Examiner* — Yuen Wong
(74) *Attorney, Agent, or Firm* — Crowell & Moring LLP (57) ABSTRACT

The purpose of the present invention is to enable precise calculation of the distance to a moving object that is detected in a monocular area even in the case where the road height varies between an overlapping area and the monocular area. According to the present invention, provided are a parallax-information obtaining unit that obtains parallax information about an overlapping area of a plurality of images captured by a plurality of cameras installed in a vehicle; and an object-distance calculating unit that calculates the distance between an object detected in a non-overlapping area and the vehicle, the non-overlapping area being an area other than the overlapping area in the images, on the basis of parallax information obtained from the overlapping area in the past.

7 Claims, 9 Drawing Sheets

(51) Int. Cl.
| | |
|---|---|
| *G06T 1/00* | (2006.01) |
| *G08G 1/16* | (2006.01) |
| *H04N 13/204* | (2018.01) |
| *B60Q 9/00* | (2006.01) |
| *G01S 17/08* | (2006.01) |
| *G01S 17/93* | (2006.01) |
| *G06K 9/00* | (2006.01) |
| *G01C 3/08* | (2006.01) |
| *H04N 13/00* | (2018.01) |

(52) U.S. Cl.
CPC ........ *G01S 17/936* (2013.01); *G06K 9/00369* (2013.01); *G06K 9/00805* (2013.01); *G06T 1/00* (2013.01); *G08G 1/16* (2013.01); *H04N 13/204* (2018.05); *B60T 2210/32* (2013.01); *G01C 3/085* (2013.01); *H04N 2013/0081* (2013.01)

(58) Field of Classification Search
CPC ... G01S 17/08; G01S 17/936; G06K 9/00369; G06K 9/00805; G08G 1/16; G06T 1/00; G01C 3/06; G01C 3/085
See application file for complete search history.

(56) References Cited

FOREIGN PATENT DOCUMENTS

| JP | 2007-232593 | 9/2007 |
|---|---|---|
| JP | 2010-079582 | 4/2010 |

OTHER PUBLICATIONS

Japanese-language Written Opinion (PCT/ISA/237) issued in PCT Application No. PCT/JP2016/082901 dated Feb. 21, 2017 (six (6) pages).
Japanese-language Office Action issued in counterpart Japanese Application No. 2015-229272 dated Jun. 4, 2019 with English translation (nine (9) pages).

\* cited by examiner

STEREO CAMERA DEVICE

TECHNICAL FIELD

The present invention relates to a stereo camera device.

BACKGROUND ART

In a system researched to enable a vehicle to travel more safely, a camera installed in the vehicle detects a pedestrian who passes in front of the vehicle and if there is a possibility that the pedestrian collides with the vehicle, a driver is warned or automated braking is performed.

A sensor that monitors an area in front of the vehicle is, for example, a millimeter-wave radar, a laser radar, a camera, or the like. As the kind of cameras, there are a monocular camera and a stereo camera including a plurality of cameras. A stereo camera that includes two cameras provided at a predetermined distance therebetween can measure a distance to a captured object by using a disparity of an overlapping area captured by the cameras. Therefore, the risk of collision with a front object can be known accurately.

However, since the stereo camera can measure the distance only in the overlapping area captured commonly by a plurality of cameras, the stereo camera may be unused for non-overlapping areas captured by the respective cameras (hereinafter the non-overlapping area is referred to as a monocular area). In view of this, PTL 1 discloses a method in which a pedestrian in a monocular area is detected by an optical flow process. However, the distance to the pedestrian cannot be known just by detecting the pedestrian in the monocular area; therefore, in this case, it is difficult to know the risk of the collision.

In view of the above, PTL 2 discloses a method for estimating a distance to a moving object that is detected in a monocular area. In this method, road surface height information that is measured in an overlapping area is also used for a road surface in a monocular area.

CITATION LIST

Patent Literature

PTL 1: JP 2005-24463 A
PTL 2: JP 2010-79582 A

SUMMARY OF INVENTION

Technical Problem

In PTL 2, the height of the road surface in the overlapping area is used directly for the monocular area; therefore, it is necessary that the height of the road surface is equal in the overlapping area and the monocular area, that is, the road surface is flat. Therefore, when the road surface in the monocular area is inclined or stepped, it is difficult to estimate the accurate distance.

An object of the present invention is to enable the accurate calculation of the distance to the moving object detected in the monocular area even when the height of the road surface is different in the overlapping area and the monocular area.

Solution to Problem

The present invention, includes: a disparity information obtaining unit that obtains disparity information of an overlapping area of a plurality of images captured by a plurality of cameras installed in a vehicle; and an object distance calculating unit that calculates a distance between the vehicle and an object detected in a non-overlapping area other than the overlapping area in each of the images on the basis of the disparity information obtained from the overlapping area in the past.

Advantageous Effects of Invention

According to the present invention, even when the height of the road surface is different in the overlapping area and the monocular area, the distance to the moving object detected in the monocular area can be calculated accurately.

DESCRIPTION OF EMBODIMENT

An embodiment of the present invention will hereinafter be described with reference to the drawings, for example. The following description expresses specific examples of the subject matter of the present invention. The present invention is, however, not limited to the examples. Various changes and modifications can be made by a person skilled in the art within the range of technical ideas disclosed in the present specification. Throughout the drawings used to describe the present invention, the components with the same function are denoted by the same reference sign and the repeated description may be omitted.

Example 1

Figure 1:
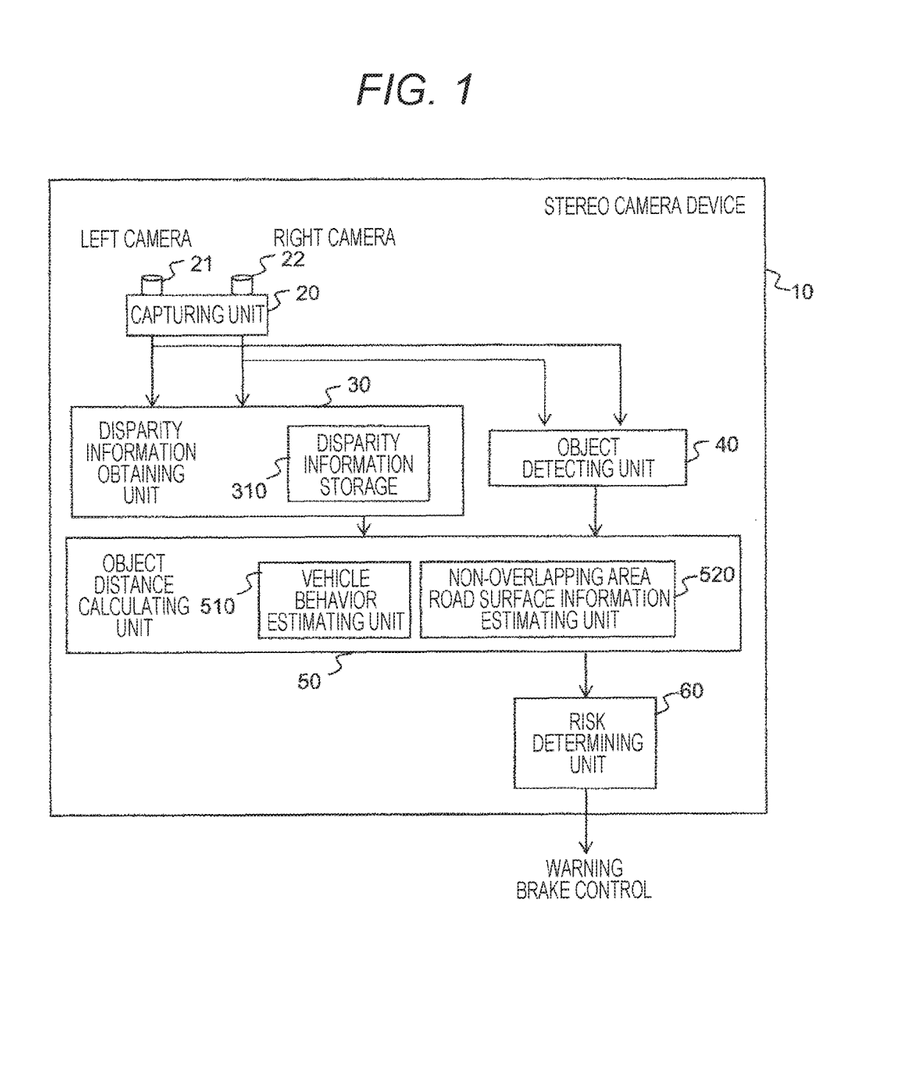
FIG. 1 is a function block diagram of a stereo camera device.

FIG. 1 is a block diagram of a stereo camera device 10. A capturing unit 20 includes two cameras of a right camera 22 and a left camera 21. Images captured by these cameras are distributed to a disparity information obtaining unit 30 and an object detecting unit 40. The disparity information obtaining unit 30 generates disparity information by using an overlapping area of the images captured by the right camera 22 and the left camera 21. Moreover, the disparity information obtaining unit 30 includes a disparity information storage unit 310 that stores the disparity information. The object detecting unit 40 detects a moving object such as a pedestrian in an image of a monocular area of each of the right camera 22 and the left camera 21. The overlapping area and the monocular area will be described with reference to FIG. 2.

An object distance calculating unit 50 calculates a distance to a moving object in a monocular area detected by the object detecting unit 40 by using road surface height information that is calculated based on the disparity information.

To calculate the distance, a vehicle behavior estimating unit 510 that estimates the amount and the direction of the movement of the vehicle, and a non-overlapping area road surface information estimating unit 520 are provided. A risk determining unit 60 outputs a brake control signal in order to warn a driver or stop a vehicle in accordance with the distance to the moving object such as a pedestrian that is calculated by the object distance calculating unit 50.

Figure 2:
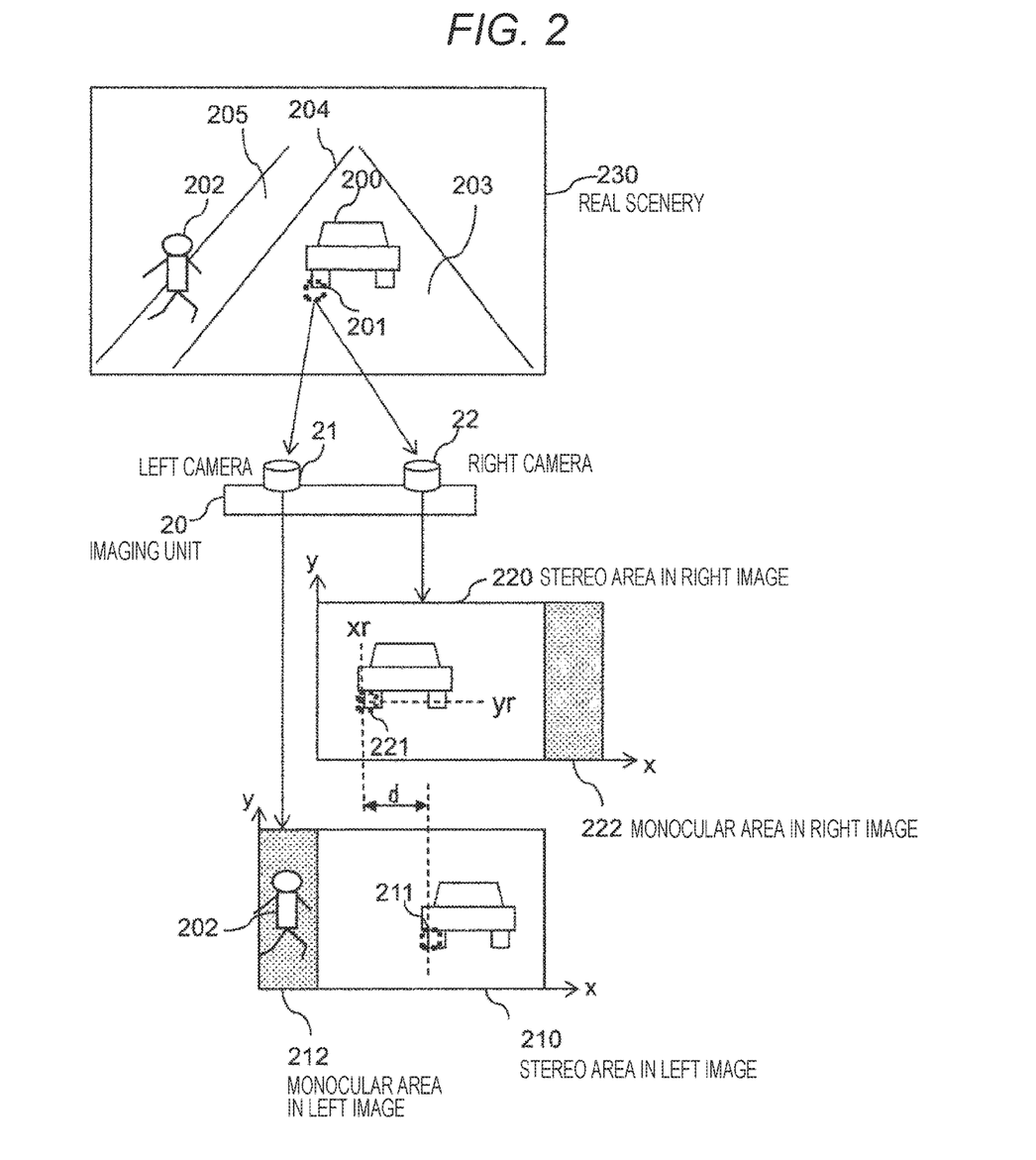
FIG. 2 illustrates stereo areas and monocular areas.

With reference to FIG. 2, an outline of an operation in which the stereo camera device 10 generates disparity data is described. Here, an overlapping area of an image from the right camera 22 and an image from the left camera 21 is referred to as a stereo area. A real scenery 230 that is seen from a front window of the vehicle including the stereo camera device 10 includes a preceding vehicle 200, a travel road surface 203, a white line 204, a sidewalk road surface 205, and a pedestrian 202.

When there are a stereo area 220 and a monocular area 222 in a right image captured by the right camera 22, and a stereo area 210 and a monocular area 212 in a left image captured by the left camera 21, a part 201 of the preceding vehicle 200 is captured at a position 221 in the stereo area 220 in the right image and captured at a position 211 in the stereo area 210 in the left image. As a result, a disparity d is generated between the position 221 and the position 211. This disparity d becomes larger as the stereo camera device 10 gets closer, and becomes smaller as the stereo camera device 10 gets farther. Such a disparity is obtained throughout the images. By using this disparity d, the distance to the stereo camera device 10 can be measured based on the principle of triangular surveying.

The distance, which is represented by Z, is obtained based on the disparity d by the following formula:

$$Z=(f \times B)/d$$

where f represents the focal distance of each of the right and left cameras and B represents the distance (length of base line) between the right camera 22 and the left camera 21. For the three-dimensional conversion of the disparity data, the distance in the three-dimension in the X and Y directions at the position where Z is obtained is expressed by the following formula:

$$X=(Z \times xr)/f$$

$$Y=(Z \times yr)/f$$

where xr represents the x coordinate on the right image 220 and yr represents the y coordinate on the right image 220.

As described above, the position (X, Y, Z) of a subject in a three-dimensional space can be obtained based on the distance from the stereo camera device 10 by using the images captured by the stereo camera device 10. However, the pedestrian 202 is captured only in the monocular area 212 in the left image in FIG. 2, and if nothing is done, the disparity data cannot be calculated and the distance cannot be estimated.

Figure 3A:
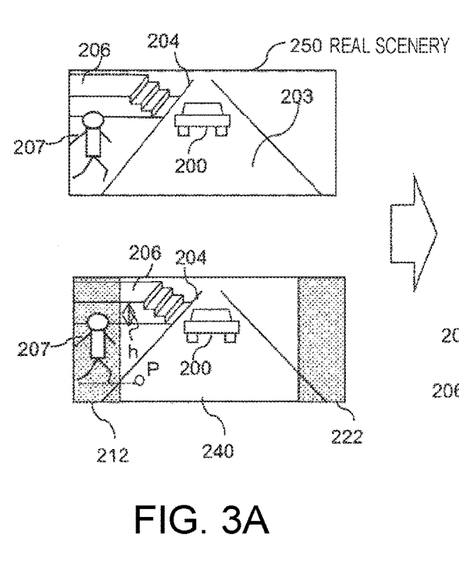
FIGS. 3A and 3B illustrate a principle of a method of estimating the height of a road surface in a monocular area.

Next, with reference to FIG. 3, a method of estimating a distance to a pedestrian in the monocular area is described. FIG. 3(a) illustrates a real scenery 250 that is seen from a front window of a vehicle, and an image obtained by capturing the scenery 250 with the stereo camera device 10. The scenery 250 includes the preceding vehicle 200, the road surface 203, the white line 204, steps 206 on the sidewalk, and a pedestrian A207. In a case of capturing the scenery 250 with the stereo camera device 10, the image is divided into three areas: a stereo area 240, a left monocular area 212, and a right monocular area 222.

In the scenery of FIG. 3(a), the steps 206 are captured in the stereo area 240. Therefore, the disparity of the steps 206 can be calculated and based on the disparity, the height h (meters) of the steps 206 from the road surface 203 can be measured. Moreover, the height of the pedestrian A207 in a longitudinal direction in the image is extended to the road surface in the stereo area 240 (for example, to point P) and the disparity data of the road surface at that point are read out and converted into the distance; thus, the distance to the pedestrian 207 in the monocular area 212 can be obtained. In this case, the point P is on the inner side than the white line 204. In regard to the point P, as compared to the case where the disparity data are obtained from one dot, forming a histogram of the disparity data of a plurality of points with that height and using the maximum value of the histogram provides the data with high resistant against noise.

Figure 3B:
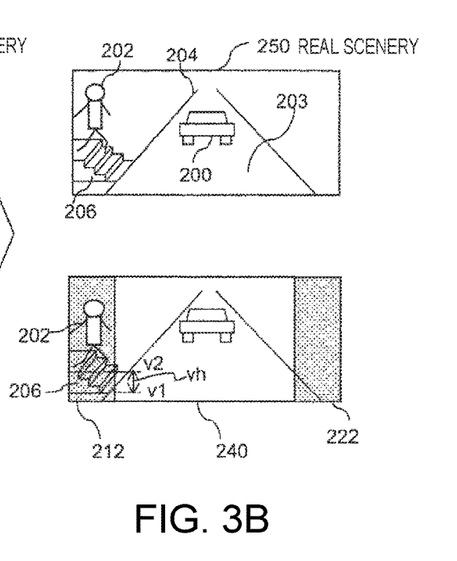

On the other hand, in the scene in FIG. 3(b), the steps 206 in the scenery 250 are closer than in the scene of FIG. 3(a) because the own vehicle has advanced. Since the own vehicle has come close to the steps 206, the steps 206 are in the monocular area 212 on the left side. In FIG. 3(b), a pedestrian B202 is on the steps 206. In the image of the monocular area 212 on the left side, the steps 206 are higher than the road surface 203; therefore, the distance to the pedestrian B202 on the steps 206 in the screen cannot be estimated accurately.

In view of this, in the scene of FIG. 3(a), the distance is saved in the disparity information storage unit 310 with the distance when measured as information of the height h (meter) from the road surface on the basis of the disparity information of the steps 206 and the road surface 203. After that, in the scene of FIG. 3(b), the road surface height information h that is stored based on the distance the own vehicle has advanced is read out and the number of pixels vh of the steps 206 in the image in the direction perpendicular to the road surface 203 is calculated; thus, the distance to the pedestrian 202 on the steps 206 is calculated.

If the pedestrian B202 is on the steps 206 in the scene of FIG. 3(b), the pedestrian B202 is at a position higher than a position v1 of the road surface 203 in the image by the height h of the steps. In this state, when a vertical coordinate v2 of the pedestrian's feet in the image is obtained and the distance is obtained using the disparity information of the road surface in the stereo area at the coordinate v2, the distance is longer than a real distance. In view of this, the height of the steps 206 from the road surface 203 is subtracted from the coordinate v2 (the height is lowered) to provide a coordinate v1. The coordinate v1 is extended to the stereo area, and based on the disparity information of the road surface at that position, the distance to the pedestrian B202 is obtained.

The coordinate width (vh) in the image from the height h is calculated as follows:

$$vh=h/(zv \times wv/f)$$

where zv is obtained by subtracting the travel distance of the own vehicle from the distance when the steps 206 are measured in the stereo area 240, wv expresses the longitudinal size of one pixel of the camera, and f is a focal distance of the camera.

Figure 4:
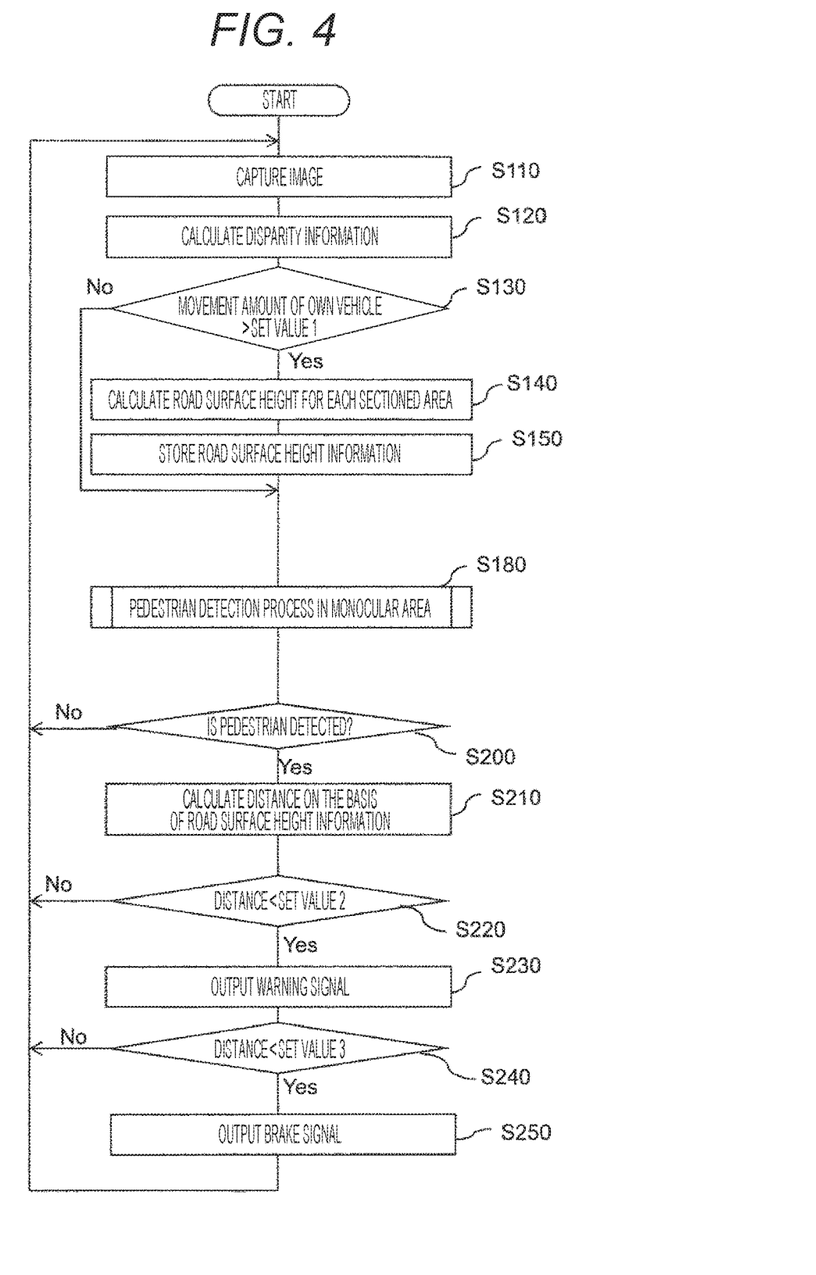
FIG. 4 illustrates how disparity information is stored.

FIG. 4 is a flowchart of estimating the distance to a pedestrian in a monocular area. First, an image in front of the vehicle is captured by using the right camera 22 and the left camera 21 of the capturing unit 20 (S110). Next, the disparity information obtaining unit 30 generates the disparity information from the captured image by a method illustrated in FIG. 2 (S120).

Next, whether the amount of movement of the own vehicle is larger than a set value 1 is determined (S130). The amount of movement of the own vehicle is estimated by the vehicle behavior estimating unit 510, and the amount of movement is estimated based on the movement distance of the vehicle by vehicle speed pulses and the direction by the turning angle of a steering wheel. This set value 1 defines the range where the image in the stereo area moves to the monocular area as the own vehicle advances, and corresponds to a section width of a section area 231 in a longitudinal direction in FIG. 4. If the movement range is larger than the set value 1, the road surface height in the section area is calculated (S140) and the result is stored in a disparity information storage 310 (S150). Next, the object detecting unit 40 performs a pedestrian detection process in the monocular area (S180).

Figure 5:
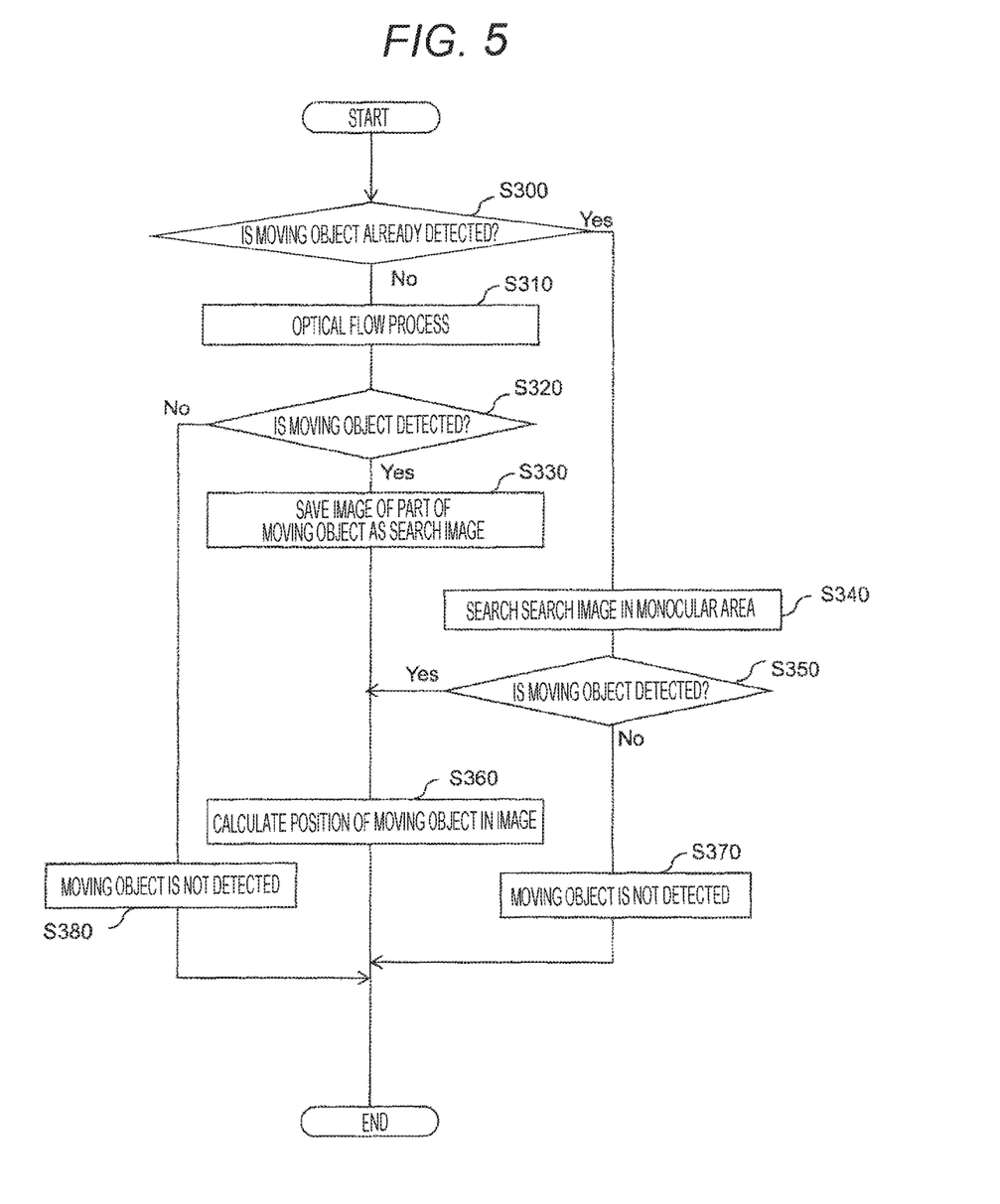
FIG. 5 is a flowchart of an entire system.
Figure 6:
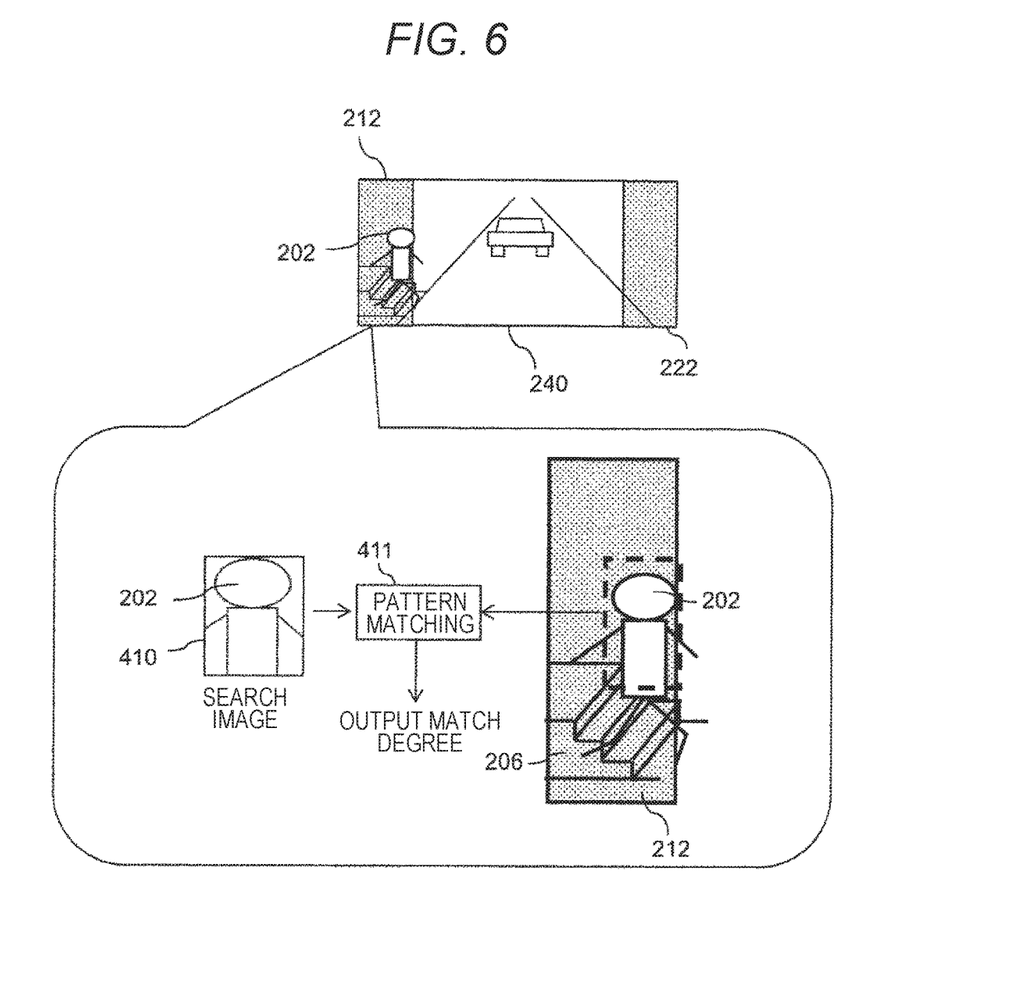
FIG. 6 is a flowchart of how a moving object is detected in the monocular area.

Although the method of detecting the pedestrian 202 is not limited to a particular method, an optical flow process is employed here as a method suitable for detecting a moving object by a moving camera. The optical flow process is to section an image into small areas and obtain the movement vector along the elapse of time for each small area. With reference to FIG. 5 and FIG. 6, a procedure of detecting the pedestrian according to the present example is described.

FIG. 5 is a flowchart of a procedure of detecting the pedestrian in the monocular area. First, whether the moving object (that is, pedestrian) is already detected in the monocular area is determined (S300). If the moving object is not detected, the optical flow process is performed for the monocular area (S310). Next, whether the moving object is detected is determined (S320). If the moving object is detected by the optical flow, an image of a part of the moving object detected by the optical flow is stored as a search image used in the subsequent process (S330).

As illustrated in FIG. 6, by using the stored image, the moving object is traced by a pattern matching method with a smaller process burden, starting from the next frame. The image of a part of the pedestrian 202 searched by the optical flow is stored as a search image 410. From the next frame, the image of the search image 410 and the image in the monocular area 212 are subjected to the pattern matching instead of the optical flow. By this method, it is only necessary to search the image 212 in the monocular area for the search image 410 once in each frame; thus, the process becomes faster than the process in the case where the optical flow process is performed in all the frames. Since the search image is extracted from the monocular area 212 as the object to be searched, the matching determination is facilitated, which is advantageous.

Back to FIG. 5, after the moving object is detected by the optical flow in S310, the position of the moving object in the image, that is, the position in a two dimension is calculated (S360). If the moving object is not detected, the process ends with a conclusion that the moving object is not detected (S380). If a time has elapsed and the image of the next frame is obtained, it is determined that the moving object is already detected in S300, and the monocular area is searched by the pattern matching using the search image 410 (S340). If the position where the patterns match is detected (S350), the process advances to S360 with a conclusion that the moving object is detected. On the other hand, if the moving object is not detected by the pattern matching, the process ends with a conclusion that the moving object is not detected (S370).

Next, back to FIG. 4, whether the pedestrian is detected in S180 is determined (S200). If it is determined that the pedestrian is detected, the distance to the pedestrian 202 is calculated based on the road surface height information calculated by the non-overlapping area road surface information estimating unit 520, that is, the height information including the steps 206 of the sidewalk (S210).

Next, in regard to the risk determining unit 60, if the distance to the pedestrian is shorter than a set value 2, a caution/warning signal is output to the driver (S230). This signal is output as a sound or light, or displayed on a screen, for example. In addition, if the pedestrian is closer than a set value 3, a brake signal is output in order to operate the braking of the own vehicle (S250). The set value 2 and the set value 3 are determined in accordance with the vehicle speed or the distance where the vehicle is able to stop.

Figure 7:
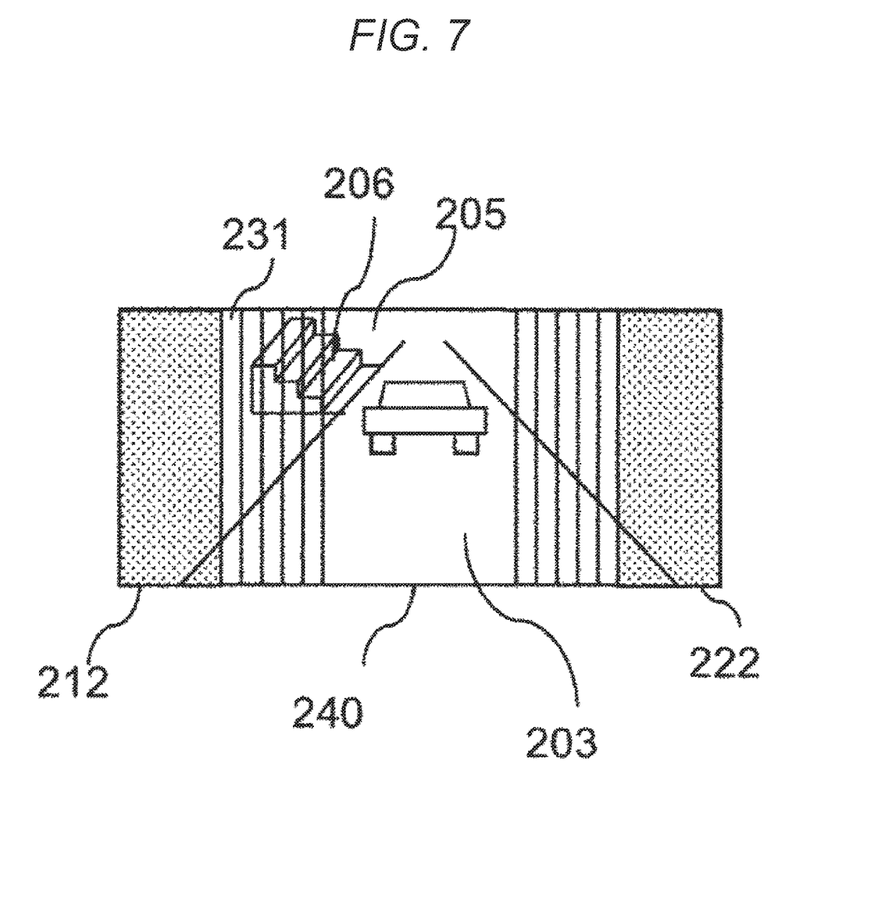
FIG. 7 illustrates an outline of a method of detecting the moving object in the monocular area.

FIG. 7 illustrates a method of storing the disparity information in the disparity information storage unit 310. When all the disparity information of the image is stored, the amount of stored data becomes large. Therefore, in FIG. 7, the stereo area 240 is sectioned vertically by a predetermined distance and the disparity between the sidewalk 205 including the steps 206 and the road surface 203 in the closest part for each section area 231 is stored in the disparity information storage unit 310. This can reduce the amount of data to be stored. The information to be stored may be the information other than the disparity information. For example, the height of the sidewalk part may be converted into information of the height from the road surface and then stored. In this case, the amount of calculation after the pedestrian is detected and before the distance to the pedestrian is calculated can be reduced, and the risk of collision with the pedestrian can be determined in a shorter time.

Example 2

Next, as Example 2, description is made of a front monitoring system in which a laser radar and a monocular camera are combined.

Figure 8:
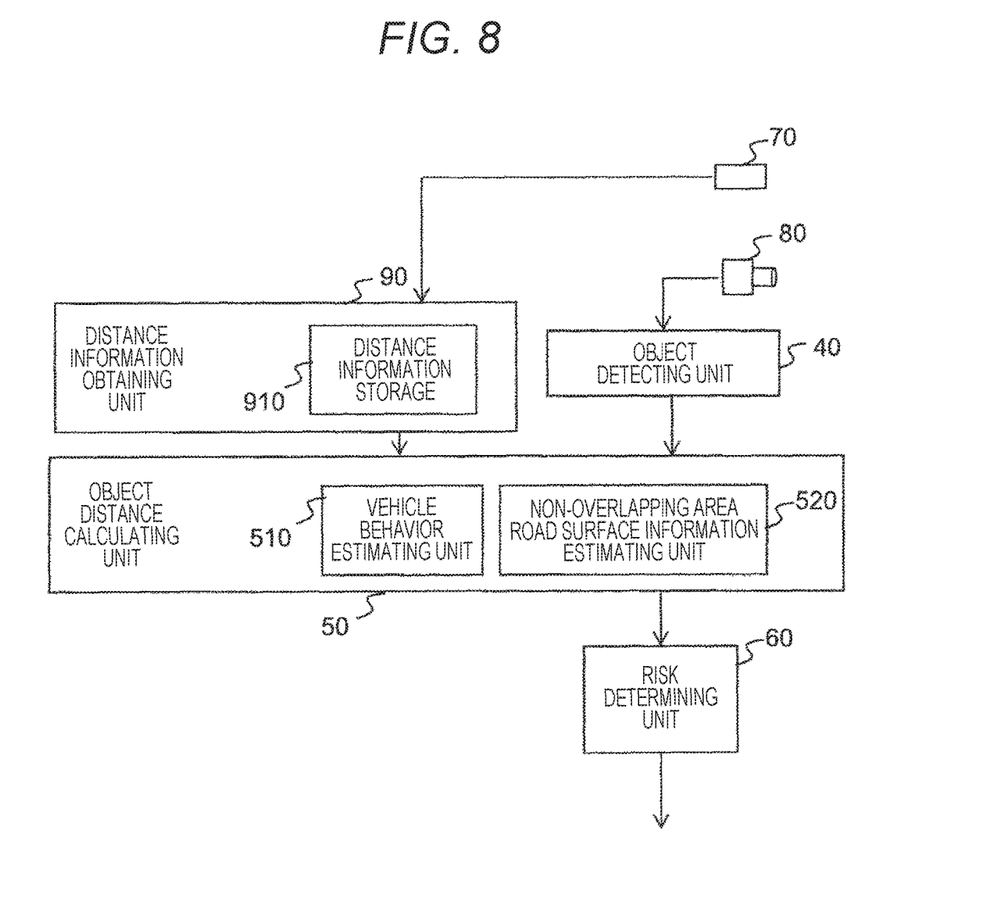
FIG. 8 is a block diagram of a front monitoring system including a laser radar and a monocular camera.

FIG. 8 illustrates a front monitoring system including a laser radar 70 and a monocular camera 80. The laser radar 70 scans with one or a plurality of infrared laser beams up, down, left, and right and by measuring the reflection time, measures the distance to an object or a road surface in front of the laser radar 70. The monocular camera 80 captures the front area, and based on the captured image, recognizes a pedestrian and a vehicle.

Figure 9:
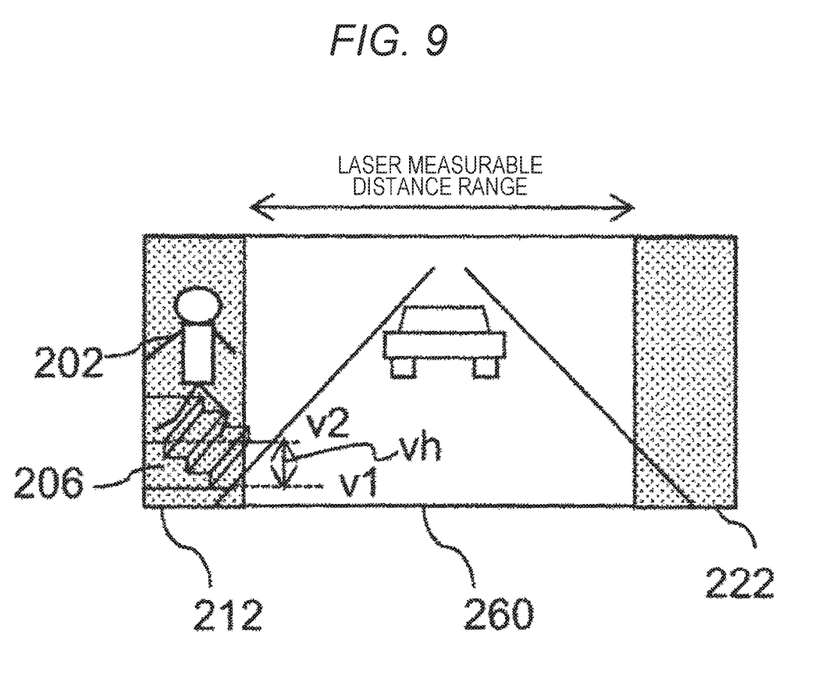
FIG. 9 illustrates a difference in measuring range between a laser radar and a monocular camera.

If the measuring range of the laser radar 70 and the capturing range of the monocular camera 80 are equal, the distance to the pedestrian recognized by the monocular camera 80 can be calculated based on the measurement data from the laser radar 70. However, as illustrated in FIG. 9, in some cases, the capturing range of the monocular camera 80 is wide and beyond a measuring range 260 of the laser radar 70. In such a case, even if the pedestrian running out of areas 212 and 222 at the end of the screen is recognized, the distance to the pedestrian cannot be measured. In view of this, the method of measuring the distance to the pedestrian who has run out with the use of the stereo camera described in Example 1 is applied.

The data measured by using the laser radar 70 are processed as three-dimensional data in the distance information obtaining unit 90. In the disparity information obtaining unit 30 illustrated in FIG. 1, the disparity information is converted into the distance information; however, the distance information obtaining unit 90 obtains the distance (Z) for each scan coordinate (X, Y) of the laser beam. The distance information storage unit 910 records this distance information as disparity information storage unit 310 does.

In the image from the monocular camera 80, the pedestrian is detected by the object detecting unit 40 as illustrated in FIG. 1. The process after this detection is the same as the process in Example 1.

According to the above examples, the height of the road surface of the sidewalk in the monocular area can be measured accurately; therefore, the distance to the pedestrian on the road surface of the sidewalk can be estimated accurately and thus, the collision risk can be accurately determined. In the present example, the distance to the pedestrian in the monocular area can be estimated as accurately as in the stereo area; therefore, as compared to the conventional technique in which the overlapping area is used as an angle of view, the effective angle of view of the stereo camera device and the front monitoring system can be increased.

REFERENCE SIGNS LIST 10 stereo camera device
20 capturing unit
21 left camera
22 right camera
30 disparity information obtaining unit
40 object detecting unit
50 object distance calculating unit
60 risk determining unit
70 laser radar
80 monocular camera
90 distance information obtaining unit
202 pedestrian
203 travel road surface
206 steps
210 stereo area in left image
212 monocular area in left image
220 stereo area in right image
222 monocular area in right image
240 stereo area in real scenery
310 disparity information storage unit
510 vehicle behavior estimating unit
520 non-overlapping area road surface information estimating unit

The invention claimed is:

1. A stereo camera device, comprising:
a plurality of cameras installed in a vehicle,
wherein the stereo camera device obtains disparity information of an overlapping area of a plurality of images captured by the plurality of cameras installed in the vehicle, and calculates a distance between the vehicle and an object detected in a non-overlapping area other than the overlapping area in each of the plurality of images on a basis of the disparity information obtained from the overlapping area in the past.

2. The stereo camera device according to claim 1, wherein the stereo camera device calculates a road surface height on the basis of the disparity information, wherein:
the object is detected on a road surface in the non-overlapping area with a height different from a height of the road surface in the overlapping area; and
the stereo camera device calculates a distance to the object detected in the non-overlapping area.

3. The stereo camera device according to claim 2, wherein the stereo camera device stores road surface height information of a sidewalk, wherein when an image area where a road surface height of the sidewalk is measured has moved to the non-overlapping area according to a movement of the vehicle, the stereo camera device calculates the distance between the object and the vehicle by correcting a position of the object in an image height direction using the road surface height information of the sidewalk stored in the stereo camera device.

4. The stereo camera device according to claim 1, wherein:
the object detected in the non-overlapping area is a pedestrian who is moving and detected by an optical flow; and
the pedestrian detected by the optical flow is traced by a pattern matching method in and after a next frame.

5. The stereo camera device according to claim 1, wherein the disparity information is stored for each of areas obtained by dividing the overlapping area at particular intervals in a vertical direction.

6. A travel control device,
wherein the travel control device detects a distance to a moving object using an overlapping area of a plurality of images, and controls warning or braking of an own vehicle on a basis of the detected distance,
wherein a timing of operating a brake of the own vehicle or a timing of warning is the same when the moving object runs out from a predetermined horizontal position in a non-overlapping area in an image and when the moving object runs out from a predetermined vertical position located at a horizontal distance from the own vehicle that is equal to a horizontal distance of the predetermined horizontal position from the own vehicle, wherein a height of the predetermined vertical position is vertically higher than a height of the predetermined horizontal position.

7. A front monitoring system comprising:
a laser radar; and
a monocular camera for monitoring an area in front of a vehicle,
wherein the front monitoring system obtains distance information from the laser radar to a measurement object, and calculates a distance between the vehicle and an object detected in a non-overlapping area out of a range where the laser radar can measure in an image from the monocular camera, on a basis of the distance information obtained by the laser radar in the past.

* * * * *